United States Patent
Watabe et al.

(10) Patent No.: US 6,356,317 B1
(45) Date of Patent: Mar. 12, 2002

(54) IMAGE PROCESSOR

(75) Inventors: Akihiro Watabe, Nara; Eiji Miyagoshi, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/911,919

(22) Filed: Aug. 15, 1997

(30) Foreign Application Priority Data

Aug. 22, 1996 (JP) .............................................. 8-220888

(51) Int. Cl.⁷ ................................................ H04N 9/64
(52) U.S. Cl. .................... 348/715; 348/714; 348/430.1; 348/439.1; 348/395.1
(58) Field of Search ................................ 348/388, 564, 348/393, 714, 715, 716, 430.1, 439.1, 415, 390, 452, 415.1, 393.1, 294.1, 395.1; 386/111, 112, 135, 68

(56) References Cited

U.S. PATENT DOCUMENTS

| | | | | |
|---|---|---|---|---|
| 5,561,465 A | * | 10/1996 | Fautier et al. | 348/415 |
| 5,734,783 A | * | 3/1998 | Shimoda et al. | 386/68 |
| 5,736,944 A | * | 4/1998 | Kurihara | 341/50 |
| 5,751,893 A | * | 5/1998 | Shimoda et al. | 386/111 |
| 5,847,771 A | * | 12/1998 | Cloutier et al. | 348/588 |
| 5,862,295 A | * | 1/1999 | Shimoda et al. | 386/68 |
| 5,907,372 A | * | 5/1999 | Oku et al. | 348/716 |
| 5,923,375 A | * | 7/1999 | Pau | 348/390 |
| 5,926,227 A | * | 7/1999 | Schoner et al. | 348/512 |
| 5,990,976 A | * | 11/1999 | Higashida | 348/588 |
| 6,064,803 A | * | 5/2000 | Watabe et al. | 395/116 |
| 6,072,548 A | * | 6/2000 | Schoner et al. | 348/845 |
| 6,088,047 A | * | 7/2000 | Bose et al. | 345/517 |
| 6,118,488 A | * | 9/2000 | Huang | 348/452 |

FOREIGN PATENT DOCUMENTS

| | | |
|---|---|---|
| EP | 0 618 722 | 10/1994 |
| EP | 0 738 084 | 10/1996 |
| JP | 61043885 | 3/1986 |
| JP | 03241963 | 10/1991 |
| JP | 07184165 | 7/1995 |
| JP | 8-18953 | 1/1996 |
| JP | 8-107482 | 4/1996 |
| JP | 08294115 | 5/1996 |
| JP | 08205147 | 9/1996 |
| JP | 08256331 | 10/1996 |
| JP | 08289302 | 11/1996 |

OTHER PUBLICATIONS

Co–Pending U.S. Patent Application No. 08/609,020 Filed Feb. 29, 1996.

S. Ishiwata, et al., "development of an MPEG2 Decoder LSI —Efficient Memory Allocation", Proceedings of the 1994 Spring Conference, C–659, Mar. 1994 and an English translation thereof.

A. Takabatake, et al., "DRAM Interface for MPEG2 Video Decoder LSI", Proceedings of the 1995 IEICE General Conference, C–586, Mar. 1995 and an English translation thereof.

Winzker, et al., "Architecture and Memory Requirements for stand–alone and hierarchical MPEG2 HDTV–Decoders with Synchronous DRAMs," Apr. 03, 1995, IEEE International Symposium on Circuits and Systems (ISCAS), pp. 609–612.

* cited by examiner

Primary Examiner—Reinhard J. Eisenzopf
Assistant Examiner—Linus H. Lo
(74) Attorney, Agent, or Firm—McDermott, Will & Emery

(57) ABSTRACT

A frame memory is provided which has five fields each having N slots, and three additional slots. Each slot has a storage capacity to store eight image lines. Four fields of the five fields serve to store motion compensation reference frames. The remaining one field and the three additional slots are used for B-picture interlace conversion. Disposed in a control unit are a slot control memory, a write slot pointer, and a read slot pointer. For an image output unit to acquire information from the frame memory in a correct slot order, the contents of the slot control memory are updated at the time of performing write operation to enter information into the frame memory by a bit stream analysis unit.

12 Claims, 18 Drawing Sheets

Fig. 9

| | (0) INITIAL VALUE | (1) I0 DECODE | (2) P1 DECODE | (3) P4 DECODE | (4) B2 DECODE | (5) B3 DECODE | (6) P5 DECODE |
|---|---|---|---|---|---|---|---|
| DTYW | | I | P | P | B | B | P |
| T_FRFW | 0 | 2 | 4 | 1 | 1 | 1 | 3 |
| B_FRFW | 1 | 3 | 0 | 2 | 2 | 2 | 4 |
| T_BRFW | 2 | 4 | 1 | 3 | 3 | 3 | 1 |
| B_BRFW | 3 | 0 | 2 | 4 | 4 | 4 | 2 |
| OPYR | 0 | 1 | 1 | 1 | 1 | 1 | 0 |
| OTYW | IP | IP | IP | IP | IP | B | IP |
| T_OFDW | 0 | 2 | 4 | 4 | 1 | 0 | 3 |
| B_OFDW | 1 | 3 | 0 | 0 | 2 | 0 | 4 |
| RFDR | 0 | 1 | 2 | 3 | 4 | 0 | 4 |

I0 OUTPUT ↔ P1 OUTPUT ↔ B2 OUTPUT ↔ B3 OUTPUT ↔ P4 OUTPUT

Fig. 10

|  | IO DECODE |||||||||||| 
|---|---|---|---|---|---|---|---|---|---|---|---|---|
|  | DEFAULT IMAGE OUTPUT |||||||DEFAULT IMAGE OUTPUT||||| 
| PERIOD | 0 | 1 | 2 | 3 | 4 | 5 | 6 | 7 | 8 | 9 | 10 | 11 |
| ORWR | 5 | 0 | 1 | 2 | 3 | 4 | 5 | 0 | 1 | 2 | 3 | 4 |
| OPYR | 0 | 1 | 1 | 1 | 1 | 1 | 1 | 0 | 0 | 0 | 0 | 0 |
| OTYW | IP | IP | IP | IP | IP | IP | IP | IP | IP | IP | IP | IP |
| RFDR | 0 | 1 | 1 | 1 | 1 | 1 | 2 | 2 | 2 | 2 | 2 | 2 |
| RSLR | 5 | 0 | 1 | 2 | 3 | 4 | 5 | 0 | 1 | 2 | 3 | 4 |
| T_OFDW | 0 | 0 | 0 | 0 | 0 | 0 | 0 | 2 | 2 | 2 | 2 | 2 |
| B_OFDW | 1 | 1 | 1 | 1 | 1 | 1 | 1 | 3 | 3 | 3 | 3 | 3 |
| T_FRFW | 2 || 2 || 2 || 2 || 2 || 2 ||
| B_FRFW | 3 || 3 || 3 || 3 || 3 || 3 ||
| T_BRFW | 4 || 4 || 4 || 4 || 4 || 4 ||
| B_BRFW | 0 || 0 || 0 || 0 || 0 || 0 ||
| T_WFDR | 4 || 4 || 4 || 4 || 4 || 4 ||
| B_WFDR | 0 || 0 || 0 || 0 || 0 || 0 ||
| WSR1 | 0 || 2 || 4 || 0 || 2 || 4 ||
| WSR2 | 1 || 3 || 5 || 1 || 3 || 5 ||
| DTYW | I || I || I || I || I || I ||
| DSTW | FD || FD || FD || FD || FD || FD ||
| DRNW | 0 | 1 || 2 || 3 || 4 || 5 || 6 | 0 |

Fig. 11

| | P1 DECODE | | | | | | | | | | | |
|---|---|---|---|---|---|---|---|---|---|---|---|---|
| | DEFAULT IMAGE OUTPUT | | | | | | | IO OUTPUT | | | | |
| PERIOD | 12 | 13 | 14 | 15 | 16 | 17 | 18 | 19 | 20 | 21 | 22 | 23 |
| ORWR | 5 | 0 | 1 | 2 | 3 | 4 | 5 | 0 | 1 | 2 | 3 | 4 |
| OPYR | 0 | 1 | 1 | 1 | 1 | 1 | 1 | 0 | 0 | 0 | 0 | 0 |
| OTYW | IP | IP | IP | IP | IP | IP | IP | IP | IP | IP | IP | IP |
| RFDR | 2 | 3 | 3 | 3 | 3 | 3 | 3 | 4 | 4 | 4 | 4 | 4 |
| RSLR | 5 | 0 | 1 | 2 | 3 | 4 | 5 | 0 | 1 | 2 | 3 | 4 |
| T_OFDW | 2 | 2 | 2 | 2 | 2 | 2 | 2 | 4 | 4 | 4 | 4 | 4 |
| B_OFDW | 3 | 3 | 3 | 3 | 3 | 3 | 3 | 0 | 0 | 0 | 0 | 0 |
| T_FRFW | | 4 | | 4 | | 4 | | 4 | | 4 | | 4 |
| B_FRFW | | 0 | | 0 | | 0 | | 0 | | 0 | | 0 |
| T_BRFW | | 1 | | 1 | | 1 | | 1 | | 1 | | 1 |
| B_BRFW | | 2 | | 2 | | 2 | | 2 | | 2 | | 2 |
| T_WFDR | | 1 | | 1 | | 1 | | 1 | | 1 | | 1 |
| B_WFDR | | 2 | | 2 | | 2 | | 2 | | 2 | | 2 |
| WSR1 | | 0 | | 1 | | 2 | | 3 | | 4 | | 5 |
| WSR2 | | 0 | | 1 | | 2 | | 3 | | 4 | | 5 |
| DTYW | | P | | P | | P | | P | | P | | P |
| DSTW | | FR | | FR | | FR | | FR | | FR | | FR |
| DRNW | 0 | 1 | | 2 | | 3 | | 4 | | 5 | | 6 | 0 |

Fig. 12

|  | P4 DECODE | | | | | | | | | | | |
|---|---|---|---|---|---|---|---|---|---|---|---|---|
|  | IO OUTPUT | | | | | | | P1 OUTPUT | | | | |
| PERIOD | 24 | 25 | 26 | 27 | 28 | 29 | 30 | 31 | 32 | 33 | 34 | 35 |
| ORWR | 5 | 0 | 1 | 2 | 3 | 4 | 5 | 0 | 1 | 2 | 3 | 4 |
| OPYR | 0 | 1 | 1 | 1 | 1 | 1 | 1 | 0 | 0 | 0 | 0 | 0 |
| OTYW | IP | IP | IP | IP | IP | IP | IP | IP | IP | IP | IP | IP |
| RFDR | 4 | 0 | 0 | 0 | 0 | 0 | 0 | 1 | 1 | 1 | 1 | 1 |
| RSLR | 5 | 0 | 1 | 2 | 3 | 4 | 5 | 0 | 1 | 2 | 3 | 4 |
| T_OFDW | 4 | 4 | 4 | 4 | 4 | 4 | 4 | 1 | 1 | 1 | 1 | 1 |
| B_OFDW | 0 | 0 | 0 | 0 | 0 | 0 | 0 | 2 | 2 | 2 | 2 | 2 |
| T_FRFW | 1 | | 1 | | 1 | | 1 | | 1 | | 1 | |
| B_FRFW | 2 | | 2 | | 2 | | 2 | | 2 | | 2 | |
| T_BRFW | 3 | | 3 | | 3 | | 3 | | 3 | | 3 | |
| B_BRFW | 4 | | 4 | | 4 | | 4 | | 4 | | 4 | |
| T_WFDR | 3 | | 3 | | 3 | | 3 | | 3 | | 3 | |
| B_WFDR | 4 | | 4 | | 4 | | 4 | | 4 | | 4 | |
| WSR1 | 0 | | 1 | | 2 | | 3 | | 4 | | 5 | |
| WSR2 | 0 | | 1 | | 2 | | 3 | | 4 | | 5 | |
| DTYW | P | | P | | P | | P | | P | | P | |
| DSTW | FR | | FR | | FR | | FR | | FR | | FR | |
| DRNW | 0 | 1 | | 2 | | 3 | | 4 | | 5 | | 6 | 0 |

| | B2 DECODE | | | | | | | | | | | |
| | P1 OUTPUT | | | | | | B2 OUTPUT | | | | | |
| PERIOD | 36 | 37 | 38 | 39 | 40 | 41 | 42 | 43 | 44 | 45 | 46 | 47 |
|---|---|---|---|---|---|---|---|---|---|---|---|---|
| ORWR | 5 | 0 | 1 | 2 | 3 | 4 | 5 | 0 | 1 | 2 | 3 | 4 |
| OPYR | 0 | 1 | 1 | 1 | 1 | 1 | 1 | 0 | 0 | 0 | 0 | 0 |
| OTYW | IP | IP | IP | IP | IP | IP | IP | B | B | B | B | B |
| RFDR | 1 | 2 | 2 | 2 | 2 | 2 | 2 | 0 | 0 | 0 | 0 | 0 |
| RSLR | 5 | 0 | 1 | 2 | 3 | 4 | 5 | 0 | 2 | 4 | 6 | 8 |
| T_OFDW | 1 | 1 | 1 | 1 | 1 | 1 | 1 | 0 | 0 | 0 | 0 | 0 |
| B_OFDW | 2 | 2 | 2 | 2 | 2 | 2 | 2 | 0 | 0 | 0 | 0 | 0 |
| T_FRFW | | 1 | | 1 | | 1 | | 1 | | 1 | | 1 |
| B_FRFW | | 2 | | 2 | | 2 | | 2 | | 2 | | 2 |
| T_BRFW | | 3 | | 3 | | 3 | | 3 | | 3 | | 3 |
| B_BRFW | | 4 | | 4 | | 4 | | 4 | | 4 | | 4 |
| T_WFDR | | 0 | | 0 | | 0 | | 0 | | 0 | | 0 |
| B_WFDR | | 0 | | 0 | | 0 | | 0 | | 0 | | 0 |
| WSR1 | | 0 | | 2 | | 4 | | 6 | | 8 | | 2 |
| WSR2 | | 1 | | 3 | | 5 | | 7 | | 0 | | 4 |
| DTYW | | B | | B | | B | | B | | B | | B |
| DSTW | | FR | | FR | | FR | | FR | | FR | | FR |
| DRNW | 0 | 1 | | 2 | | 3 | | 4 | | 5 | | 6 | 0 |

Fig. 14

| | B3 DECODE | | | | | | | | | | | |
|---|---|---|---|---|---|---|---|---|---|---|---|---|
| | B2 OUTPUT | | | | | | B3 OUTPUT | | | | | |
| PERIOD | 48 | 49 | 50 | 51 | 52 | 53 | 54 | 55 | 56 | 57 | 58 | 59 |
| ORWR | 5 | 0 | 1 | 2 | 3 | 4 | 5 | 0 | 1 | 2 | 3 | 4 |
| OPYR | 0 | 1 | 1 | 1 | 1 | 1 | 1 | 0 | 0 | 0 | 0 | 0 |
| OTYW | B | B | B | B | B | B | B | B | B | B | B | B |
| RFDR | 0 | 0 | 0 | 0 | 0 | 0 | 0 | 0 | 0 | 0 | 0 | 0 |
| RSLR | 2 | 1 | 3 | 5 | 7 | 0 | 4 | 6 | 8 | 2 | 1 | 3 |
| T_OFDW | 0 | 0 | 0 | 0 | 0 | 0 | 0 | 0 | 0 | 0 | 0 | 0 |
| B_OFDW | 0 | 0 | 0 | 0 | 0 | 0 | 0 | 0 | 0 | 0 | 0 | 0 |
| T_FRFW | 1 | | 1 | | 1 | | 1 | | 1 | | 1 | |
| B_FRFW | 2 | | 2 | | 2 | | 2 | | 2 | | 2 | |
| T_BRFW | 3 | | 3 | | 3 | | 3 | | 3 | | 3 | |
| B_BRFW | 4 | | 4 | | 4 | | 4 | | 4 | | 4 | |
| T_WFDR | 0 | | 0 | | 0 | | 0 | | 0 | | 0 | |
| B_WFDR | 0 | | 0 | | 0 | | 0 | | 0 | | 0 | |
| WSR1 | 6 | | 2 | | 3 | | 7 | | 4 | | 8 | |
| WSR2 | 8 | | 1 | | 5 | | 0 | | 6 | | 2 | |
| DTYW | B | | B | | B | | B | | B | | B | |
| DSTW | FD | | FD | | FD | | FD | | FD | | FD | |
| DRNW | 0 | 1 | | 2 | | 3 | | 4 | | 5 | | 6 | 0 |

Fig. 15

|  | P5 DECODE | | | | | | | | | | | |
|---|---|---|---|---|---|---|---|---|---|---|---|---|
|  | B3 OUTPUT | | | | | | | P4 OUTPUT | | | | |
| PERIOD | 60 | 61 | 62 | 63 | 64 | 65 | 66 | 67 | 68 | 69 | 70 | 71 |
| ORWR | 5 | 0 | 1 | 2 | 3 | 4 | 5 | 0 | 1 | 2 | 3 | 4 |
| OPYR | 0 | 1 | 1 | 1 | 1 | 1 | 1 | 0 | 0 | 0 | 0 | 0 |
| OTYW | B | B | B | B | B | B | B | IP | IP | IP | IP | IP |
| RFDR | 0 | 0 | 0 | 0 | 0 | 0 | 0 | 3 | 3 | 3 | 3 | 3 |
| RSLR | 5 | 7 | 0 | 4 | 6 | 8 | 2 | 0 | 1 | 2 | 3 | 4 |
| T_OFDW | 0 | 0 | 0 | 0 | 0 | 0 | 0 | 3 | 3 | 3 | 3 | 3 |
| B_OFDW | 0 | 0 | 0 | 0 | 0 | 0 | 0 | 4 | 4 | 4 | 4 | 4 |
| T_FRFW | 3 | | 3 | | 3 | | 3 | | 3 | | 3 | |
| B_FRFW | 4 | | 4 | | 4 | | 4 | | 4 | | 4 | |
| T_BRFW | 1 | | 1 | | 1 | | 1 | | 1 | | 1 | |
| B_BRFW | 2 | | 2 | | 2 | | 2 | | 2 | | 2 | |
| T_WFDR | 1 | | 1 | | 1 | | 1 | | 1 | | 1 | |
| B_WFDR | 2 | | 2 | | 2 | | 2 | | 2 | | 2 | |
| WSR1 | 0 | | 1 | | 2 | | 3 | | 4 | | 5 | |
| WSR2 | 0 | | 1 | | 2 | | 3 | | 4 | | 5 | |
| DTYW | P | | P | | P | | P | | P | | P | |
| DSTW | FR | | FR | | FR | | FR | | FR | | FR | |
| DRNW | 0 | 1 | | 2 | | 3 | | 4 | | 5 | | 6 | 0 |

Fig. 17

|←——— B3 DECODE ———→|

| 4 | 4 | 4 | ᴿ4 | 4 | ᵂ4 | ᵂ4 | | | | | | | | | |
|---|---|---|---|---|---|---|---|---|---|---|---|---|---|---|---|
| 6 | 6 | 6 | 6 | ᴿ6 | ᵂ6 | ᵂ6 | | | | | | | | | |
| 8 | 8 | 8 | 8 | 8 | ᴿ8 | 8 | ᵂ8 | ᵂ8 | | | | | | | |
| 2 | 2 | 2 | 2 | 2 | 2 | ᴿ2 | ᵂ2 | ᵂ2 | | | | | | | |
| 1 | 1 | 1 | 1 | 1 | 1 | 1 | ᴿ1 | 1 | 1 | 1 | 1 | 1 | 1 | 1 | 1 |
| | 3 | 3 | 3 | 3 | 3 | 3 | 3 | ᴿ3 | 3 | 3 | 3 | 3 | 3 | 3 | 3 |
| | | 5 | 5 | 5 | 5 | 5 | 5 | 5 | ᴿ5 | 5 | 5 | 5 | 5 | 5 | 5 |
| | | | 7 | 7 | 7 | 7 | 7 | 7 | 7 | ᴿ7 | 7 | 7 | 7 | 7 | 7 |
| | | | | 0 | 0 | 0 | 0 | 0 | 0 | 0 | ᴿ0 | 0 | 0 | 0 | 0 |
| | | | | | 4 | 4 | 4 | 4 | 4 | 4 | 4 | ᴿ4 | 4 | 4 | 4 |
| | | | | | | 6 | 6 | 6 | 6 | 6 | 6 | 6 | ᴿ6 | 6 | 6 |
| | | | | | | | 8 | 8 | 8 | 8 | 8 | 8 | 8 | ᴿ8 | 8 |
| | | | | | | | | 2 | 2 | 2 | 2 | 2 | 2 | 2 | ᴿ2 |
| | | | | | | | | | | | | | | | |
| ᵂ2 | | | | | | | | | | | | | | | |
| ᵂ1 | | | | | | | | | | | | | | | |
| 3 | ᵂ3 | ᵂ3 | | | | | | | | | | | | | |
| ᴿ5 | ᵂ5 | ᵂ5 | | | | | | | | | | | | | |
| 7 | ᴿ7 | 7 | ᵂ7 | ᵂ7 | | | | | | | | | | | |
| 0 | 0 | ᴿ0 | ᵂ0 | ᵂ0 | | | | | | | | | | | |

|←— B2 OUTPUT —→|←——— B3 OUTPUT ———→|

Fig. 18

IMAGE PROCESSOR

BACKGROUND OF THE INVENTION

This invention relates to an image processor suitably used to decode image information.

The compression and decompression of moving picture data is internationally standardized by MPEG (Moving Picture Image Coding Experts Group) named after the working group of the ISO/IEC. A major element of an MPEG decoder used to reproduce moving picture data is a data processing unit that is formed of a variable length decoder (VLD), an inverse quantizer (IQ), an inverse discrete cosine transformer (IDCT), and a motion compensator (MC). Such an MPEG decoder further requires a memory for a plurality of frames for motion compensation and interlace conversion.

One of the outstanding features of the MPEG is that two frames (i.e., an earlier frame and a later frame in time) are used for motion compensation reference. However, the application of motion compensation to every image produces propagation of errors, and problems with special reproduction. To cope with these drawbacks, an intra-coded picture ("I-picture"), a predictive-coded picture ("P-picture"), and a bidirectionally predictive-coded picture ("B-picture"), have been introduced. An I-picture, i.e., a picture of the coding type I, does not refer to any other images at all. A P-picture, i.e., a picture of the coding type P, is subjected to motion compensation by an earlier frame. A B-picture, i.e., a picture of the coding type B, is subjected to bidirectional motion compensation by both an earlier frame and a later frame. B-pictures are not used as a reference frame when other frames are decoded.

A coding type prediction is now described. A bit stream of input pictures is entered to an MPEG decoder in the order I0, P3, B1, B2 for decoding. The picture P3 is motion compensated from the picture I0. The picture B1 is motion compensated from the pictures I0 and P3. The picture B2 is motion compensated from the pictures I0 and P3. The display of the pictures is made in the order I0, B1, B2, P3. The order of decoding and the order of display disagree and it is therefore necessary to make a change in the order. Additionally, decoding of the pictures B1 and B2 requires data for two image frames of the pictures I0 and P3, therefore requiring a frame memory for two image frames as a reference to motion compensation. For this reason, the MPEG decoder requires two frames as a reference to motion compensation.

The order of decoding by the pixel and the order of output by the pixel of the MPEG are described. In the television system, all the even-numbered lines are provided prior to the odd-numbered lines, in other words pixel output is performed every other line, starting with the upper left and ending with the lower right. An area made up of the even-numbered lines is called the top field while on the other hand an area made up of the odd-numbered lines is called as the bottom field. In the interlace output, a top field is first provided from the upper left down to the lower right and a bottom field is then provided from the upper left down to the lower right.

Image data are 2-D data, and data adjacent in space to each other are considered having a strong correlation therebetween. However, for the case of interlace output, paying attention to a specific top field's line, its overlying line, i.e., a line one line up of the top field line in question, is a bottom field's line. Although pixels of a line have a very strong spatial correlation with pixels of its adjacent line, they are separated in time. Accordingly, when motion is very active, there may be the possibility that a line has a stronger correlation not with a line one line up but with a line two lines up, for they lie adjacent to each other in time. Assuming that such a possibility may exist, the order of decoding by the pixel of the MPEG is roughly divided into two types, namely the one for the frame structure and the other for the field structure.

Under the MPEG standard, decoding is carried out using 16 by 16 pixels as a basic unit (called a macroblock). The macroblock is decoded from left to right. Here, the rightmost pixel of the uppermost line of an image is contained in the rightmost macroblock of the image. When the decoding of the rightmost macroblock is completed, this means that data for 16 lines are decoded. Accordingly, the decoding of each of data for 16 lines is almost simultaneously completed.

For the case of the frame structure, data for one image frame constitute a macroblock formed of 16 by 16 pixels, and decoding is performed per macroblock. As a result, top and bottom fields are almost simultaneously decoded. This produces a complete disagreement between the order of decoding and the order of image output. A change in the order is required to make.

For the case of the field structure, one image frame is divided into two sections, a top field and a bottom field. Each field includes macroblocks, each of the macroblocks being formed of 16×16 pixels, and decoding is carried out per macroblock. A single macroblock does not extend over both the top and bottom fields. After all the data for the top field are decoded, the data for the bottom field are subjected to decoding. In this case, the images will be provided in almost the same order that they were decoded. However, the order of decoding and the order of image output do not agree perfectly because of decoding by the macroblock.

Image output is performed such that the top field of an image is first provided and the bottom field is then provided. When paying attention to the time point at which the output of the last eight lines of a top field starts, the decoding of a macroblock for the last 16 lines of the image frame must be completed before the starting point. The reason is that it is not until the decoding of the last macroblock of an image starts that the values of the rightmost 16 pixels of the last eight lines are determined. Therefore, both the top field decoding and the bottom field decoding must be completed at the foregoing point. From the point on, the eight top field lines and all the lines of the bottom field must be provided sequentially; however, the data for them have already been decoded. Therefore, if the data are not stored in frame memory, the data will be lost before they are output, therefore resulting in no image output. This gives rise to a need for the provision of a frame memory with an about half-frame storage capacity to store all the data for the bottom field and the eight top field lines.

To sum up, a 2-frame memory is required for motion compensation, and an about half-frame memory is required for B-picture interlace conversion, in other words at least an about 2.5-frame memory is required.

Ishiwata et al. report, in a paper entitled "Development of an MPEG2 Decoder LSI—Efficient Memory Allocation," Proceedings of the 1994 IEICE Spring Conference, C-659, March '94, an MPEG decoder that employs a 1.5-frame memory for B-picture interlace conversion. Takabatake et al. report, in a paper entitled "DRAM Interface for MPEG2 Video Decoder LSI," Proceedings of the 1995 IEICE General Conference, C-586, March '95, an MPEG decoder that employs a one-frame memory for B-picture interlace conversion.

However, both the above-described MPEG decoders are expensive because they require a memory with a storage capacity ranging from one frame to one and a half frames, for B-picture interlace conversion. In principle, the B-picture interlace conversion requires just a half-frame memory and therefore there still exists room for a reduction of the required memory storage capacity for B-picture interlace conversion.

SUMMARY OF THE INVENTION

Accordingly, it is an object of the present invention to achieve a reduction of the storage capacity of a frame memory employed in MPEG decoders. It is another object of the present invention to achieve efficient use of the frame memory.

The present invention is based on the following points. The first point is that once a B-picture is provided it will not be reused. The second point is that it is possible to predict when the region of a macroblock currently being decoded is provided by analyzing an additional information portion (called "header") of an input picture.

The present invention provides an improved image processor with a frame memory wherein (a) the frame memory includes five blocks, each of the five blocks having a storage capacity to store a half image-frame, and a single additional block having a smaller storage capacity than each of the five blocks, (b) four blocks, selected from among said five blocks, serve to temporarily store I- and/or P-pictures for motion compensation reference and the remaining one block and said additional block together form a data memory for B-picture interlace conversion, and (c) thereafter, the data memory is reconstructed using one of the selected four blocks and the additional block.

Such arrangement makes it possible to achieve, with an about 2.5-frame memory, not only B-picture interlace conversion but also motion compensation with respect to all types of pictures. Additionally, for the case of the three or more successive I- and/or P-pictures, the data memory is not used for B-pictures, which produces the advantage that one block, which forms a portion of the data memory, may be used for storage of I- and/or P-pictures.

In the above-described image processor, it is preferred that (a) the five blocks and the additionally block are divided into respective pluralities of slots each of the slots having a predetermined storage capacity, (b) the image processor further comprises a slot control memory for storing slot numbers and a controller for controlling both read and write operations of the data memory by making use of the slot numbers stored in the slot control memory, and (c) the controller writes a slot number, which was used in a write operation of entering information to the data memory, to the slot control memory for performing a read operation of acquiring information from said data memory.

As a result of such arrangement, it becomes possible to update the contents of the slot control memory at the time of a write operation of the data memory in such a way so as to allow the data memory to be read in a correct slot order. Accordingly, it is possible to achieve B-picture interlace conversion with an about half-frame memory by the arrangement that the operation of write to a slot of the data memory is carried out immediately the operation of read from the slot is carried out.

BRIEF DESCRIPTION OF THE DRAWINGS

FIG. 9 is a diagram showing in outline an example of the operation of the MPEG decoder of FIG. 1.

FIG. 10 is a diagram showing in detail an example of the operation of the MPEG decoder of FIG. 1.

FIG. 11 is a continuation to FIG. 10.

FIG. 12 is a continuation to FIG. 11.

FIG. 14 is a continuation to FIG. 13.

FIG. 15 is a continuation to FIG. 14.

FIG. 17 is a continuation to FIG. 16.

FIG. 18 is an equivalent diagram to FIG. 16 when the additional block of FIG. 2 is formed of two additional slots.

DETAILED DESCRIPTION OF THE INVENTION

An MPEG decoder of the present invention for reproducing moving picture data in real time is now described by reference to the accompanying drawings.

Figure 1:
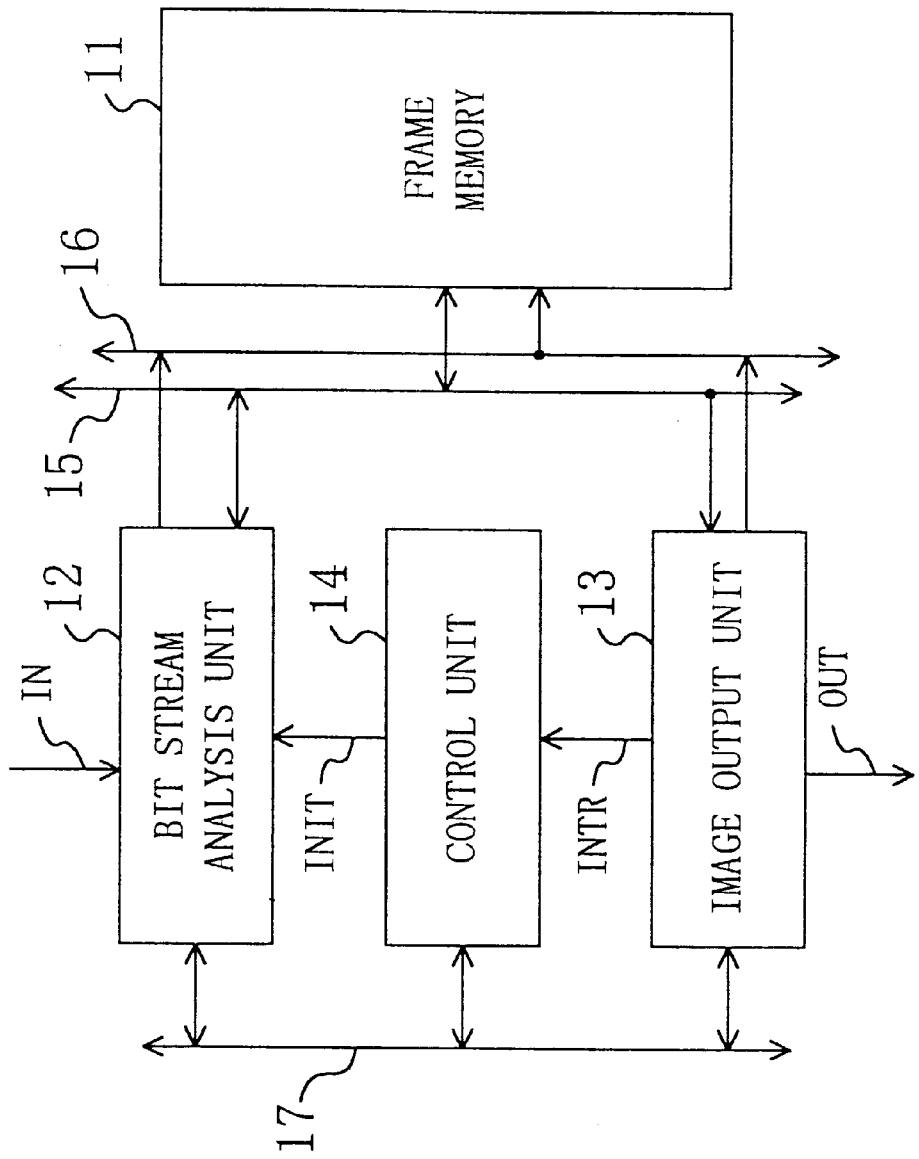
FIG. 1 is a block diagram showing an example of the MPEG decoder in accordance with the present invention.

Referring first to FIG. 1, an example of the structure of the MPEG decoder is illustrated. The MPEG decoder 10 has a frame memory 11 for storing about 2.5-frame video data, a bit stream analysis unit (hereinafter called "BSAU") 12 for analyzing an input bit stream IN, an image output unit 13 for providing an image output signal OUT and an interruption signal INTR, and a control unit 14 for providing, in response to the interruption signal INTR, an initiation signal INIT to the BSAU 12. 15 is a data bus. 16 is an address bus. 17 is a register bus. In addition to analyzing a header portion of the input bit stream IN, the BSAU 12 has the function to perform decoding of a macroblock and write a result of the decoding operation to the frame memory 11. These two functions of the BSAU 12 are initiated by the initiation signal INIT received from the control unit 14. The frame memory 11 is for storage of motion compensation reference images and for interlace conversion. The image output unit 13 reads reconstructed video data out of the frame memory 11 and provides the image output signal OUT in order of interlace. Connection of the image output signal OUT to a display unit makes it possible to display a decoded moving picture on the screen. Additionally, the image output unit 13 sends out the interruption signal INTR to the control unit 14 to the timing of output. The control unit 14 can read internal registers of the BSAU 12 and the image output unit 13 and set a value to each of the internal registers, over the register bus 17.

Figure 2:
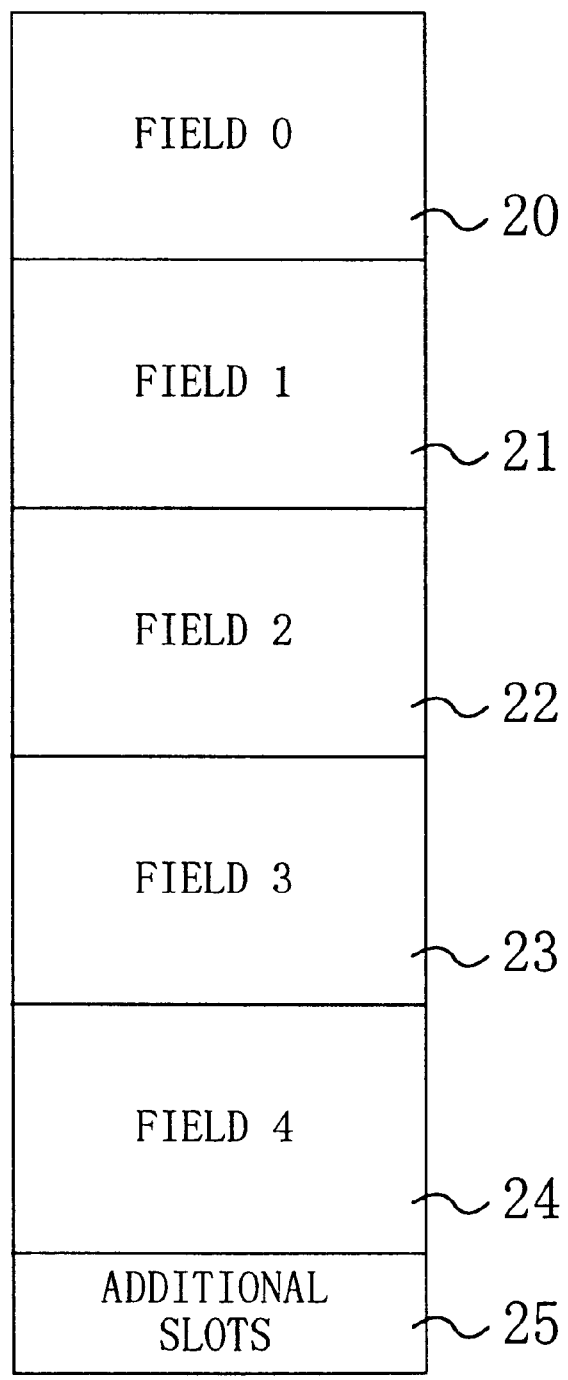
FIG. 2 is a conceptual diagram showing the internal structure of a frame memory shown in FIG. 1.
Figure 3:
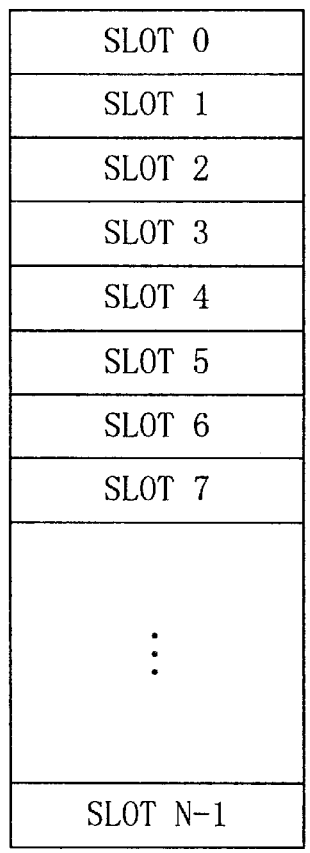
FIG. 3 is a conceptual diagram showing the internal structure of a memory block shown in FIG. 2.
Figure 4:
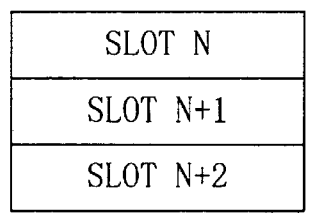
FIG. 4 is a conceptual diagram showing the internal structure of an additional memory block shown in FIG. 2.

FIG. 2 outlines the frame memory 11. FIGS. 3 and 4 show in detail the frame memory 11. As shown in FIG. 2, the frame memory 11 is composed of five blocks 20–24 and one additional block 25. These five blocks 20–24 are assigned respective field numbers, namely, from Field #0 to Field #4, respectively. As shown in FIG. 3, one block, e.g., the block 20, is formed of N slots which are assigned respective slot numbers from Slot #0 to Slot #N−1. Here, note that N is the amount depending on the size of image subjected to be decoded by the MPEG decoder 10. For example, N=30 for the case of the NTSC (National Television System Committee) image. Each of the N slots is able to store eight lines of the image. That is, the block 20 has the ability to store data for 240 lines of the image, in other words the block 20 is able to store one field (half a frame) of an NTSC image. Each of the remaining four blocks 21, 22, 23, and 24 is likewise formed of N slots. As shown in FIG. 4, the additional block 25 is made up of three additional slots which are assigned respective slot numbers, i.e., Slot #N, Slot #N+1, and Slot #N+2.

The frame memory 11 is controlled by the slot. A slot (eight lines), a unit of control, is half of the macroblock's vertical size (16 lines) and is the most suitable unit for dealing with both the frame and field structures. More specifically, slots are designated by field numbers and slot numbers. For instance, the first of the slots in the block 20 is designated by Field #0 and Slot #0. The first of the slots in the additional block 25 is designated by Field #0 and Slot #N and may be designated by Field #1 and Slot #N.

Of the five blocks 20–24, four blocks are used for the storage of motion compensation reference images and the remaining one block and the additional block 25 are used for B-picture interlace conversion. The number of slots used for a B-picture, e.g., N+3, is represented as Sn in the following description. For example, the top and bottom fields of an I-picture are stored in Slot #0 to Slot #N−1 of Field #0 and in Slot #1 to Slot #N−1 of Field #1, respectively, and the top and bottom fields of a P-picture are stored in Slot #0 to Slot #N−1 of Field #2 and in Slot #1 to Slot #N−1 of Field #3, respectively. In a field in which a top field is stored, the first eight lines of the top field are stored in Slot #0 of the field, the next eight lines are stored in Slot #1, and so on. A B-picture is stored in, for example, Slot #0 to Slot #Sn−1 of Field #4. At this time, three additional slots, i.e., slots #N to #N+2, are used. Note that which slots store a picture's top field varies depending on the image structure (the frame structure and the field structure). Default image data, as an initial setting, are already written to the fields of the frame memory 11. For example, data equivalent to the color of black are written to the frame memory 11 and the default image continues to be output until an image as a decode result is output.

Figure 5:
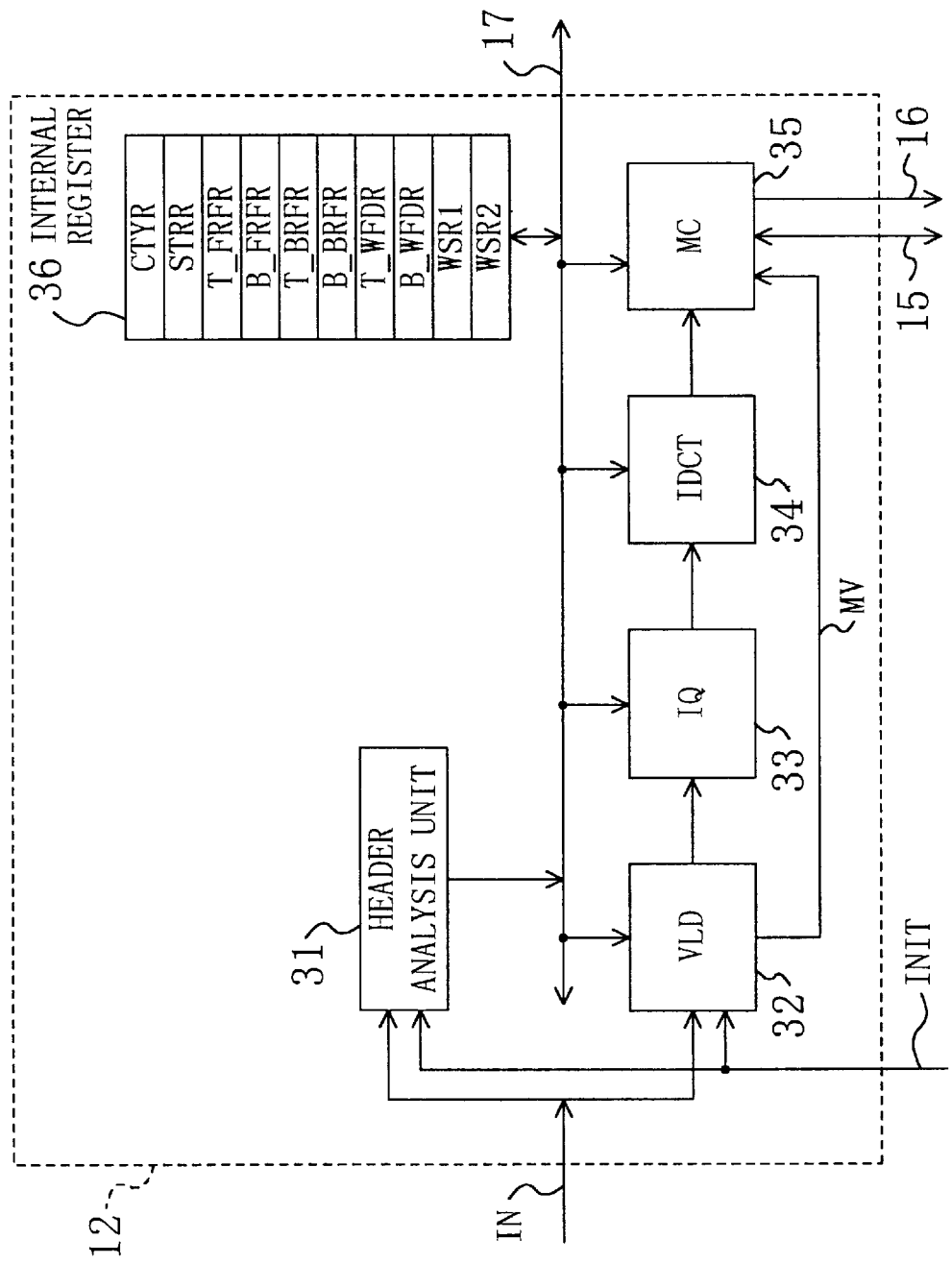
FIG. 5 is a block diagram showing the internal structure of a BSAU (bit stream analysis unit) shown in FIG. 1.

FIG. 5 illustrates an internal structure of the BSAU 12 shown in FIG. 1. The BSAU 12 includes a header analysis unit 31, a variable length decoder (VLD) 32, an inverse quantizer (IQ) 33, an inverse discrete cosine transformer (IDCT) 34, a motion compensator (MC) 35, and an internal register 36. The internal register 36 has ten registers, namely a coding type register (CTYR), a structure register (STRR), a forward reference field register for top (T_FRFR), a forward reference field register for bottom (B_FRFR), a backward reference field register for top (T_BRFR), a backward reference field register for bottom (B_BRFR), a write field register for top (T_WFDR), a write field register for bottom (B_WFDR), a first write slot register (WSR1), and a second write slot register (WSR2). The register CTYR serves to store the type of coding for input images. The register STRR indicates whether an input image has the frame structure or the field structure. The four registers T_FRFR, B_FRFR, T_BRFR, and B_BRFR each serve to designate a field number indicative of the storage location of a motion compensation reference image in the frame memory 11. The two registers T_WFDR and B_WFDR each serve to designate a write field number of the frame memory 11. The two registers WSR1 and WSR2 each serve to designate a write slot number of the frame memory 11.

In response to initiation signal INIT received from the control unit 14, the header analysis unit 31 or the VLD 32 is made active. When the header analysis unit 31 is made active, the header analysis unit 31 starts decoding image header information contained in the input bit stream IN to enter information about the image coding type and information about the image structure to the register CTYR and to the register STRR, respectively. On the other hand, when the VLD 32 is made active, the IQ 33, the IDCT 34, and the MC 35 are sequentially made active whereby 16-line video data are written, over the data bus 15, to the frame memory 11. This amount, i.e., 16 lines, is equivalent to 45 macroblocks when the number of lateral pixels=720. The MC 35 performs motion compensation, creates the final video data, and writes the reconstructed video data to the frame memory 11. The VLD 32 provides the motion vector, MV, to the MC 35 for motion compensation. The slots of the frame memory 11 are specified by address on the address bus 16.

In the BSAU 12, only the MC 35 relates to memory control. The MC 35 must know the location of an image for prediction in the frame memory 11 for the purpose of motion compensation. In order to specify such a location, the MC 35 uses the registers T_FRFR, B_FRFR, T_BRFR, and B_BRFR. A top field portion of the forward-reference data is stored in Slot #0 to Slot #N−1 of a field that is designated by the register T_FRFR.

The registers T_WFDR, B_WFDR, WSR1, WSR2, and STRR are used to determine slots to which the reconstructed video data are written. The write locations are determined as follows. For the case of the frame structure, the top eight lines are written to a slot that is specified by a field number designated by the register T_WFDR and a slot number determined by the register WSR1 and the bottom eight lines are written to a slot that is specified by a field number determined by the register B_WFDR and a slot number determined by the register WSR2. On the other hand, for the case of the field structure, in regard to the top field (the first half portion of a frame), the upper eight lines are written to a slot that is specified by a field number determined by the register T_WFDR and a slot number determined by the register WSR1 and the lower eight lines are written to a slot that is specified by a field number determined by the register T_WFDR and a slot number determined by the register WSR2. In regard to the bottom field (the second half portion), the upper eight lines are written to a slot that is specified by a field number determined by the register B_WFDR and a slot number determined by the register WSR1 and the lower eight lines are written to a slot that is specified by a field number determined by the register B_WFDR and a slot number determined by the register WSR2. As describe above, it is arranged such that a mixture of top and bottom fields does not exist in one slot. Additionally, the setting of registers of the registers in the internal register 36 concerning memory control is performed by the control unit 14 via the register bus 17.

Figure 6:
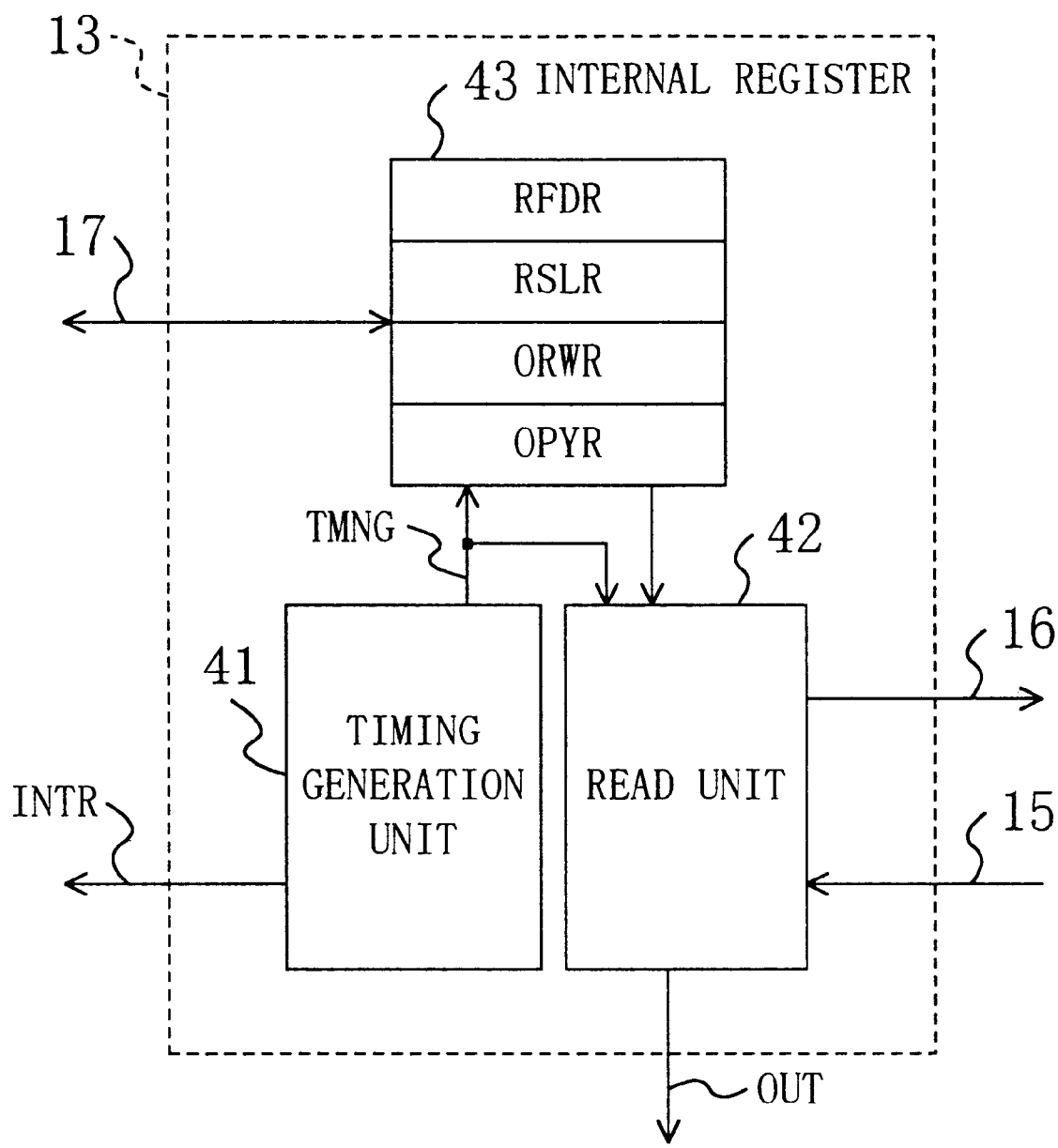
FIG. 6 is a block diagram showing the internal structure of an image output unit shown in FIG. 1.

FIG. 6 depicts an internal structure of the image output unit 13 shown in FIG. 1. The image output unit 13 includes a timing generation unit 41, a read unit 42, and an internal register 43. The internal register 43 is made up of four registers, namely, a read field register (RFDR), a read slot register (RSLR), an output row register (ORWR), and an output parity register (OPYR). The register RFDR serves to designate a read field number of the frame memory 11. The register RSLR serves to designate a read slot number in the frame memory 11. The register ORWR serves to provide an indication of where a line, currently being output, is located in one field. The register OPYR serves to provide an indication of which of top and bottom fields is currently being output.

Figure 7:
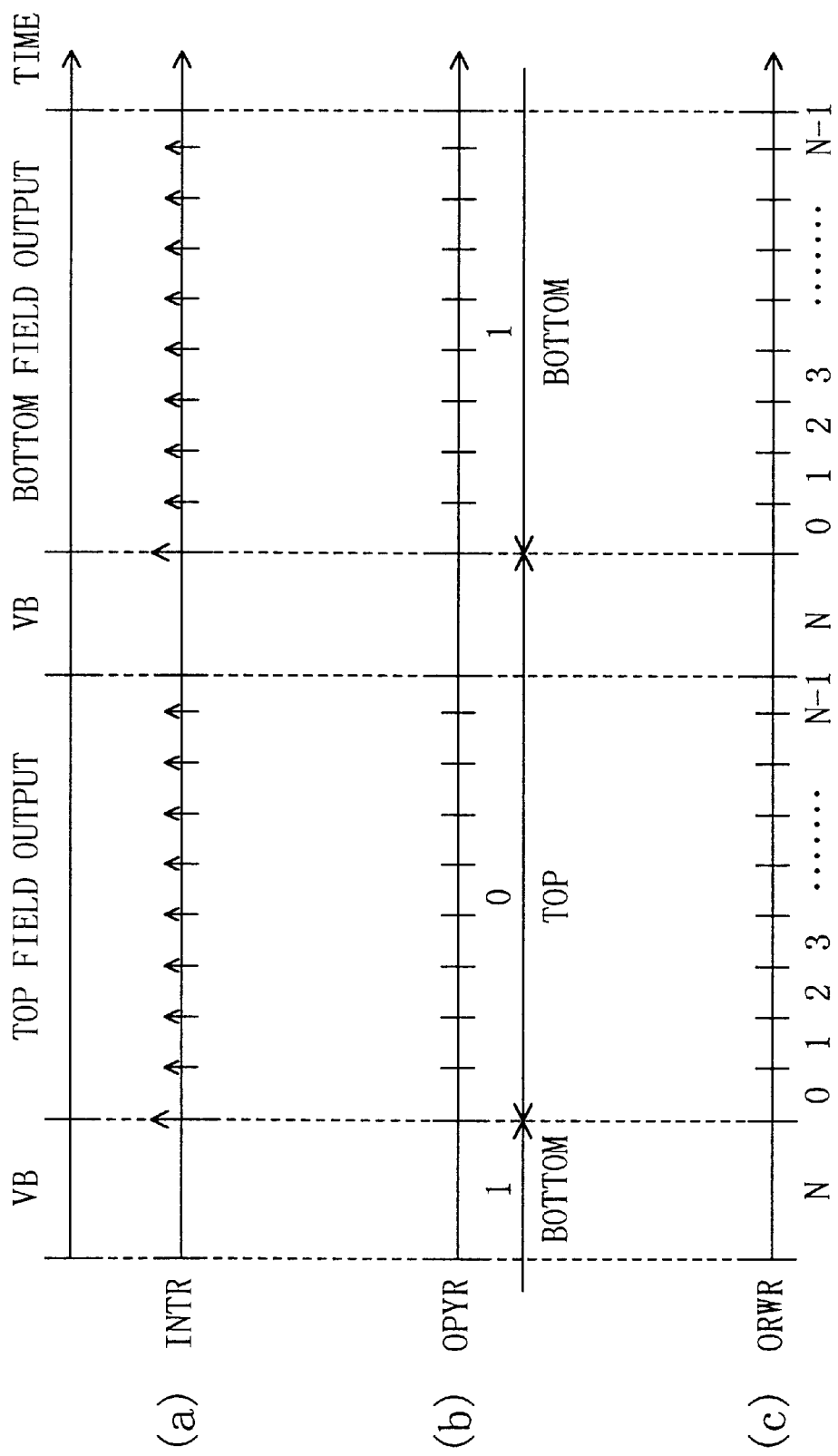
FIG. 7 is a diagram showing in outline the operation of the image output unit of FIG. 1.

FIG. 7 shows in outline the operation of the image output unit 13. One cycle of the output is formed of a vertical blanking period (VB), a top field output period, another VB, and a bottom field output period. For example, in the case of the NTSC, output is made for 30 cycles per second. The timing generation section 41 generates a timing signal TMNG in order that the image output section 13 may operate at constant cycle. Further, the timing generation section 41 sends to the control unit 14 the interruption signal INTR for every output of eight lines to the screen. The interruption signal INTR is generated at the starting point of providing top and bottom fields, as shown in FIG. 7(*a*). Thereafter, the interruption signal INTR is generated for every output of eight lines. In synchronization with the timing signal TMNG generated by the timing generation unit 41, the read unit 42 reads the slots designated in order of scan so as to provide the image output signal OUT. A read slot is designated by a pair of registers, the registers RFDR and RSLR. These registers RFDR and RSLR for read slot setting are set by the control unit 14 via the register bus 17 at the occurrence of interruption. Further, the registers ORWR and OPYR are changed by the timing generation unit 41. The value of the register OPYR becomes "0" immediately before each field's output start interruption if the current state is that the next output is a top field, as shown in FIG. 7(*b*). On the other hand, the value of the register OPYR becomes "1" if the current state is that the next output is a bottom field. The value of the register ORWR becomes "0" immediately before each field's output start interruption and is thereafter increased by one immediately before each 8-line termination interruption, as shown in FIG. 7(*c*).

Figure 8:
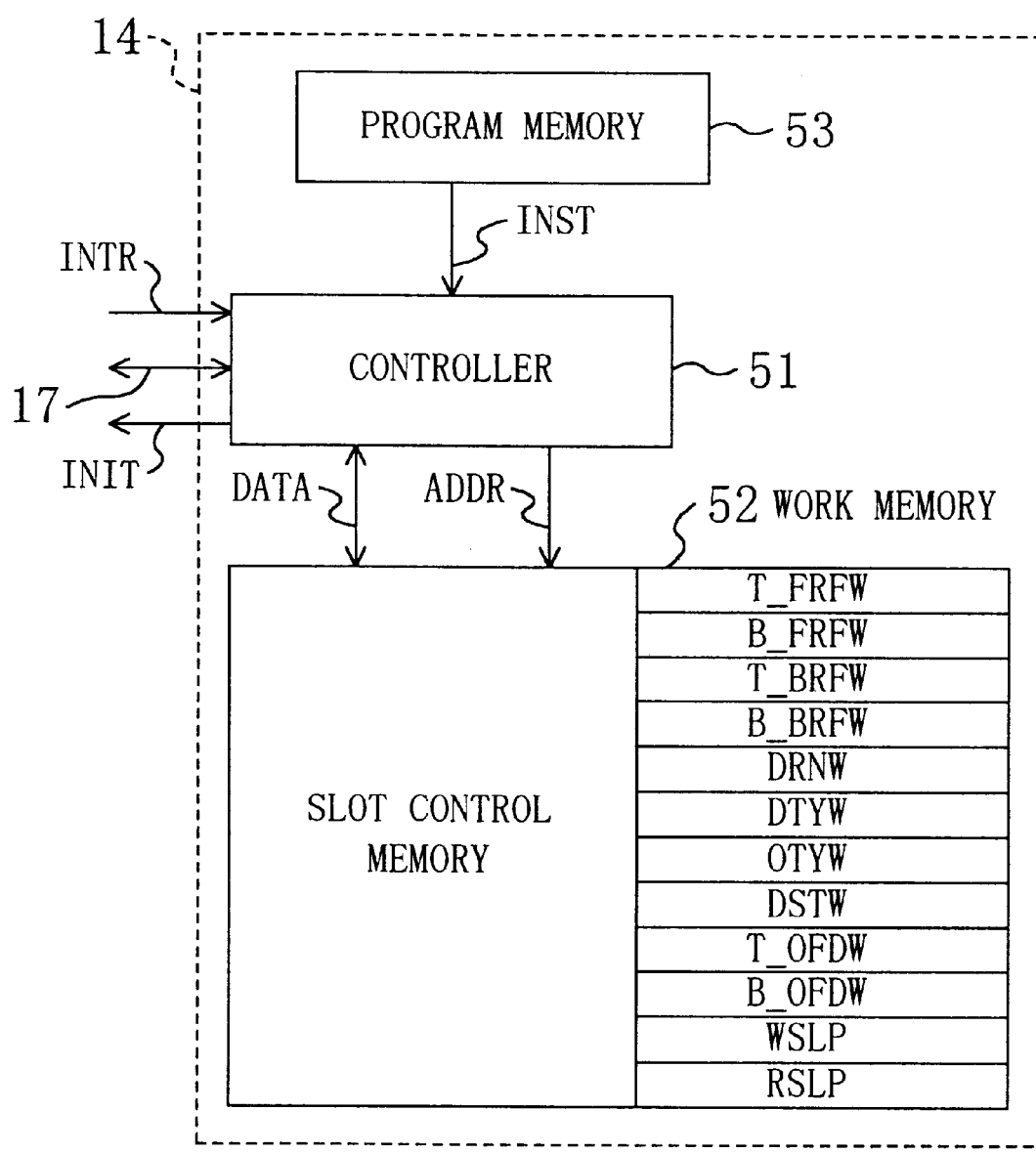
FIG. 8 is a block diagram showing the internal structure of a control unit shown in FIG. 1.

FIG. 8 depicts in block form an internal structure of the control unit 14 of FIG. 1. The control unit 14 has a controller 51, a work memory 52, and a program memory 53. The work memory 52 has a slot control memory (SCM) and twelve works. These twelve works are a forward reference field work for top (T_FRFW), a forward reference field work for bottom (B_FRFW), a backward reference field work for top (T_BRFW), a backward reference field work for bottom (B_BRFW), a decode row number work (DRNW), a decode type work (DTYW), an output type work (OTYW), a decode structure work (DSTW), an output field work for top (T_OFDW), an output field work for bottom (B_OFDW), a pointer for write slot (WSLP), and a pointer for read slot (RSLP). The four works T_FRFW, B_FRFW, T_BRFW, and B_BRFW, which correspond to the four registers T_FRFR, B_FRFR, T_BRFR, and B_BRFR of the BSAU 12, respectively, each designate a field number indicative of the storage location of a motion compensation reference image in the frame memory 11. The work DRNW serves to store a row number indicating how far the decoding of one frame proceeds. The row number increases. For example, the row number is 0 during the decoding of the first 16 lines and the row number is 1 during the decoding of the next 16 lines, and so on. The work DTYW serves to indicate the coding type of an image currently being decoded. The work OTWY serves to indicate whether the coding type of an image currently being output is the coding type B or not. The work OTWY is used to draw a distinction between the memory control technique for the coding type B and the memory control technique for a different coding type. The work DSTW serves to indicate whether an image currently being decoded has the field structure or the frame structure and affects the setting of write slots and the access to the SCM. The two works T_OFDW and B_OFDW each serve to indicate a field number for an output image. The pointers WSLP and RSLP are used for memory control in the case of the coding type B, which is described later. Each of the pointers WSLP and RSLP constantly holds an address indicating a word in the SCM.

Stored in the words at Address #0 to Address #Sn−1 of the SCM in the work memory 52 are initial values ranging by one from 0 to Sn−1. These initial values result from assigning numbers to write slots used in decoding of an image of the coding type B which arrives first. The ten works of the work memory 52 are initialized as shown below.

T_FRFW=0
B_FRFW=1
T_BRFW=2
B_BRFW=3
DTYW=I
OTYW=IP
T_OFDW=0
B_OFDW=1
WSLP=0
RSLP=Sn

The controller 51 sequentially executes instructions INST written in the program memory 53. In the first place, the controller 51 executes a normal routine for setting the internal register 36 of the BSAU 12. In response to the interruption signal INTR from the image output unit 13, the controller 51 shifts towards an interruption process routine for setting the internal register 43 of the image output unit 13.

The control unit 14 executes a normal routine in order to control the BSAU 12. More specifically, the following procedures 1.1 to 1.14 are carried out.

Procedure 1.1: The header analysis unit 31 is made active. The header analysis unit 31 then sets respective values to the registers CTYR and STRR of the internal registers 36.

Procedure 1.2: The value of the register CTYR is written to the work DTYW.

Procedure 1.3: The value of the register STTR is written to the work DSTW.

Procedure 1.4: When the work DTYW indicates either "I" or "P" and when the work OTYW is "IP", a first and second field numbers necessary for designating write fields are determined as follows. A field number, which is not contained in any one of the four works T_FRFW, B_FRFW, T_BRFW, and B_BRFW, is chosen. For example, when these four works designate Field #0, Field #1, Field #2, and Field #3, respectively, then Field #4 is selected as field number. When Field #2, Field #3, Field #4, and Field #0 are indicated by the four works, then Field #1 is selected as field number. The selected field number serves as the first field number. The value of the work T_FRFW serves as the second field number.

Procedure 1.5: When the work DTYW is either "I" or "P" and when the work OTYW is "B", then the value of the work T_FRFW is the first field number and the value of the work B_FRFW is the second field number.

Procedure 1.6: When the work DTYW is either "I" or "P", then the four works T_FRFW, B_FRFW, T_BRFW, and B_BRFW are updated. More specifically, the value of the work T_BRFW is written to the work T_BRFW, the value of the work B_BRFW is written to the work B_FRFW, and the first and second field numbers decided in Procedure 1.5 are written to the work T_BRFW and to the work B_BRFW, respectively.

Procedure 1.7: The setting of motion compensation reference fields to the internal register 36 of the BSAU 12 is performed. More specifically, the value of the work T_FRFW is written to the register T_FRFR, the value of the work B_FRFW is written to the register B_FRFR, the value of the work T_BRFW is written to the register T_BRFR, and the value of the work B_BRFW is written to the register B_BRFR.

Procedure 1.8: Write fields are set in the internal register 36 of the BSAU 12. More specifically, when the work DTYW is either "I" or "P", the value of the register T_BRFR is written to the register T_WFDR and the value of the register B_BRFR is written to the register B_WFDR. On the other hand, when the work DTYW is "B", a field number, which is not contained in any one of the four registers T_FRFR, B_FRFR, T_BRFR, and B_BRFR, is chosen. The selected field number is written to the register T_WFDR as well as to the register B_WFDR.

Procedure 1.9: A "0" is written to the work DRNW.

PROCEDURE 1.10: The setting of write slots is performed. This procedure will be discussed later in detail.

Procedure 1.11: The BSAU 12 decodes a macroblock for 16 lines.

Procedure 1.12: Upon completion of decoding of one frame, there is made a return to Procedure 1.1.

Procedure 1.13: The work DRNW is increased by one.

Procedure 1.14: There is made a return to Procedure 1.10 in order to decode a macroblock for the next 16 lines.

The control unit 14 controls, by execution of the interruption process routine, the image output unit 13. More specifically, the control unit 14 performs operations of determining whether the output image is a B-picture or not, determining a read field number, and determining a slot number. If either an I-picture or a P-picture is being decoded, what is required is just to provide a previously decoded image, i.e., a forward reference image. A B-picture is output after a half-frame delay from the time the decoding of the B-picture starts. Therefore, when a B-picture is being decoded at the time of providing the next frame, what is required is just to provide the B-picture. More specifically, every time an interruption occurs the following Procedures 2.1 to 2.6 are executed.

Procedure 2.1: When the register ORWR is "0" and when the register OPYR is at "0 (top field's output start)", the value of the work DTYW is written to the work OTYW. The work OTWY indicates whether an image that is provided next has the coding type "B" or not. More specifically, when the work DTYW is either "I" or "P", "IP" is written to the work OTYW. On the other hand, when the work DTYW is "B", "B" is written to the work OTYW.

Procedure 2.2: When the register ORWR is "0", when the register OPYR is "0 (top field's output start)", and when the work OTYW is "IP", the value of the work T_FRFW is written to the work T_OFDW and the value of the work B_FRFW is written to the work B_OFDW. At this time, the forward reference image is a previously decoded I-picture or a previously decoded P-picture. Accordingly, during decoding of the I- or P-picture, a previously decoded image is output.

Procedure 2.3: When the register ORWR is "0", when the register OPYR is "0 (top field's output start)", and when the work OTYW is "B", a field number, which is not contained in any one of the four registers T_FRFW, B_FRFW, T_BRFW, and B_BRFW, is chosen and the selected field number is written to the work T_OFDW as well as to the work B_OFDW. A field of the frame memory 11, to which an image of the coding type B is written, should be neither a forward reference field nor a backward reference field.

Procedure 2.4: The already determined values of the works T_OFDW and B_OFDW are set to the image output unit 13. More specifically, when the register OPYR is "0 (when the next output is a top field)", the field number of the work T_OFDW is set to the register RFDR of the image output unit 13. On the other hand, when the register OPYR is "1 (when the next output is a bottom field)", the field number of the work B_OFDW is set to the register RFDR of the image output unit 13.

Procedure 2.5: The setting of read slots is performed. This Procedure 2.5 will be discussed later in detail.

Procedure 2.6: The interruption process is terminated.

FIG. 9 shows in outline the operation of the MPEG decoder 10 of FIG. 1, in other word FIG. 9 shows an example of dealing with write and read fields. The bit stream IN is applied to the BSAU 12 in the order I0, P1, P4, B2, B3, P5 with reference to FIG. 9. The letter (e.g., I of the picture I0) indicates the coding type and the number indicates the order of display (output).

At the starting point of the decoding period of the picture I0 (i.e., Period 1), the value of the work OTYW is "IP". Therefore, in Period 1, according to Procedures 1.4 and 1.6 and based on the initial value of Period 0, the values of the four works T_FRFW, B_FRFW, T_BRFW, and B_BRFW are updated to 2, 3, 4, and 0, respectively. The value of the work T_BRFW, i.e., 4, is used as a top write field number, and the value of the work B_BRFW, i.e., 0, is used as a bottom write field number. The picture I0 is written to Field #4 and Field #0 of the frame memory 11.

In the decoding period of the picture P1, i.e., Period 2, according to Procedures 1.4 and 1.6, the values of the four works T_FRFW, B_FRFW, T_BRFW, and B_BRFW are updated to 4, 0, 1, and 2, respectively. The value of the work T_BRFW, i.e., 1, is used as top write field number, and the value of the work B_BRFW, i.e., 2, is used as bottom write field number. Accordingly, the picture P1, which is motion compensated by forward reference to the picture I0 written to Field #4 and Field #0, is written to Field #1 and Field #2 of the frame memory 11.

In the decoding period of the picture P4, i.e., Period 3, according to Procedures 1.4 and 1.6, the values of the four works T_FRFW, B_FRFW, T_BRFW, and B_BRFW are updated to 1, 2, 3, and 4, respectively. The value of the work T_BRFW, i.e., 3, is used as top write field number, and the value of the work B_BRFW, i.e., 4, is used as bottom write field number. Accordingly, the picture P4, which is motion compensated by forward reference to the picture P1 written to Field #1 and Field #2, is written to Field #3 and to Field #4 of the frame memory 11.

In the decoding period of the picture B2, i.e., Period 4, the four works T_FRFW, B_FRFW, T_BRFW, and B_BRFW are not updated. The field number, which is not contained in any one of these four works, i.e., 0, is used as top write field number and as bottom write field number. The motion compensated picture B2 is written to Field #0 and the three additional slots of the frame memory 11. At this time, the picture P1 in Field #1 and Field #2 is forward referred to and the picture P4 in Field #3 and Field #4 is backward referred to.

Also, in the decoding period of the picture B3, i.e., Period 5, the four works T_FRFW, B_FRFW, T_BRFW, and B_BRFW are not updated. The field number, which is not contained in any one of these four works, i.e., 0, is used as top write field number and as bottom write field number. Accordingly, the motion compensated picture B3 is written to Field #0 and the three additional slots. At this time, the picture P1 in Field #1 and Field #2 is forward referred to, and the picture P4 in Field #3 and Field #4 is backward referred to.

At the starting point of the decoding period of the picture P5, i.e., Period 6, the value of the work OTWY is "B". Therefore, in Period 6, according to Procedures 1.5 and 1.6, the values of the four works T_FRFW, B_FRFW, T_BRFW, and B_BRFW are updated to 3, 4, 1, and 2, respectively. The value of the work T_BRFW, i.e., 1, serves as top write field number and the value of the work B_BRFW, i.e., 2, serves as bottom write field number. Accordingly, the motion compensated picture P5 is written to Field #1 and Field #2. At this time, the picture P4 in Field #3 and Field #4 is forward referred to.

As previously described by reference to FIG. 7(b), the value of the register OPYR becomes "0" immediately before each field's output start interruption if the current state is that the next output is a top field, and the value of the register OPYR becomes "1" if the current state is that the next output is a bottom field. That is, at the top field output starting point, the value of the register OPYR changes from "1" to "0". FIG. 9 shows that in synchronization with such a change in the value of the register OPYR from "1" to "0" the works T_OFDW and B_OFDW are updated.

At the starting point of the second half portion of Period 2, according to Procedure 2.2, the values of the two works T_OFDW and B_OFDW are updated to 4 and to 0, respectively, using the values of the two works T_FRFW and B_FRFW. Accordingly, the top field of the picture I0 stored in Field #4 of the frame memory 11 is output in the second half portion of Period 2 and the bottom field of the picture I0 stored in Field #0 of the frame memory 11 is output in the first half portion of Period 3.

At the starting point of the second half portion of Period 3, according to Procedure 2.2, the values of the two works T_OFDW and B_OFDW are updated to 1 and to 2, respectively. Accordingly, the top field of the picture P1 stored in Field #1 is output in the second half portion of Period 3 and the bottom field of the picture P1 stored in Field #2 is output in the first half portion of Period 4.

At the starting point of the second half portion of Period 4, according to Procedure 2.3, a field number, which is not contained in any one of the four works T_FRFW, B_FRFW, T_BRFW, and B_BRFW, i.e., 0, is written to the two works T_OFDW and B_OFDW. Accordingly, the picture B2 starts to be output after a half-frame delay from the decode starting point of the picture B2, and the top field of the picture B2 is output in the second half portion of Period 4 and the bottom field of the picture B2 is output in the first half portion of Period 5.

Also, in the starting point of the second half portion of Period 5, according to Procedure 2.3, a field number, which is not contained in any one of the four works T_FRFW, B_FRFW, T_BRFW, and B_BRFW, i.e., 0, is written to the two works T_OFDW and B_OFDW. Accordingly, the picture B3 starts to be output after a half-frame delay from the decode starting point of the picture B3, and the top field of the picture B3 is output in the second half portion of Period 5 and the bottom field of the picture B3 is output in the first half portion of Period 6.

At the starting point of the second half portion of Period 6, by making use of the values of the two works T_FRFW and B_FRFW according to Procedure 2.2, the values of the two works T_OFDW and B_OFDW are updated to 3 and to 4, respectively. Accordingly, the top field of the picture P4 stored in Field #3 is output in the second half portion of Period 6 and the bottom field of the picture P4 stored in Field #4 is output in the first half portion of the next period.

Referring to FIG. 9, the output image is obtained in the order I0, P1, B2, B3, and P4. FIG. 9 shows that, immediately after the top field of the picture I0 is read out of Field #4 in the second half portion of Period 2, the bottom field of the picture P4 is written to Field #4 in the first half portion of Period 3. This achieves effective utilization of the fields of the frame memory 11. Although, from the starting point of the second half portion of Period 4 to the termination point of the second half portion of Period 5, operations of write and read of Field #0 and the three additional slots are performed at the same time, the occurrence of problems can be avoided by slot control which is described below.

The write slot setting procedure in relation to Procedure 1.10 is discussed in detail. Roughly speaking, the control unit 14 performs the setting of the registers WSR1 and WSR2 of the BSAU 12 and thereafter waits for definite conditions to be met.

The setting of the registers WSR1 and WSR2 is first explained. When the work DTYW is either "I" or "P" and when the work DSTW indicates the frame structure, the value of the work DRNW is written to the registers WSR1 and WSR2. When the work DTYW is either "I" or "P" and when the work DSTW indicates the field structure, a result of (the value of the work DRNW)×2 is written to the register WSR1 and a result of (the value of the work DRNW)×2+1 is written to the register WSR2. However, if DRNW×2≧N, DRNW×2 is changed to DRNW×2−N and DRNW×2+1 is changed to DRNW×2+1−N. By the above-described setting, when the work DTYW is either "I" or "P", the top field is written to a field designated by the register T_WFDR and the bottom field is written to a field designated by the register B_WFDR, regardless of the image structure. Within each field, the first eight lines are written to Slot #0, the next eight lines are written to Slot #1, and so on.

When the work DTYW is "B", the control unit 14 performs the following Procedures 3.1 to 3.7, in order to set the registers WSR1 and WSR2.

Procedure 3.1: A first slot number X is read out of a word stored at an address of the SCM designated by the pointer WSLP.

Procedure 3.2: A second slot number Y is read out of a word stored at the next address.

Procedure 3.3: The first slot number X is written to the register WSR1.

Procedure 3.4: The second slot number Y is written to the register WSR2.

Procedure 3.5: The first slot number X is written to the SCM for preparing the setting of the register RSLR. More specifically, when the work DSTW indicates the frame structure, the first slot number X is written to a word at an address of the SCM designated by (the value of the pointer WSLP)+Sn−(the value of the work DRNW). On the other hand, when the work DSTW indicates the field structure, the first slot number X is written to a word at an address of the SCM designated by (the value of the pointer WSLP)+Sn.

Procedure 3.6: In order to prepare the setting of the register RSLR, the second slot number Y is written to the SCM. More specifically, when the work DSTW indicates the frame structure, the second slot number Y is written to a word at an address of the SCM designated by (the value of the pointer WSLP)+Sn−(the value of the work DRNW)+N. On the other hand, when the work DSTW indicates the field structure, the second slot number Y is written to a word at an address of the SCM designated by (the value of the pointer WSLP)+Sn+1.

Procedure 3.7: The pointer WSLP is increased by two.

The control unit 14 performs the setting of the registers WSR1 and WSR2 of the BSAU 12 and thereafter waits for any one of the following Conditions 1 to 4 to be met. This is necessary for preventing a slot from being written by data before the slot is read.

Condition 1: In Condition 1, the following sub-conditions should be met, namely, (i) the work DTYW is either "I" or "P", (ii) the values of the works T_OFDW and T_BRFW disagree with each other, and (iii) the values of the works B_OFDW and B_BRFW disagree with each other. If Condition 1 is met, this means that a field, which is a current target of write, is ready to be written by data because the field in question was already read.

Condition 2: In Condition 2, the following sub-conditions should be met, namely (i) the work DTYW is either "I" or "P", (ii) the work DSTW indicates the frame structure, and (iii) the value of the register ORWR is greater than the value of the work DRNW. If Condition 2 is met, this means a slot having a slot number smaller than the value of the register ORWR is ready to be written by data because the slot in question was already read.

Condition 3: In Condition 3, the following sub-conditions should be met, namely (i) the work DTYW is either "I" or "P", (ii) the work DSTW indicates the field structure, and (iii) it is in the period of top field decoding. At the time of carrying out either decoding of the coding type I or decoding of the coding type P, one field at least is available. A top field is written to the available field and it is possible to perform write operations.

Condition 4: In Condition 4, the following sub-conditions should be met, namely (i) the work DTYW is "B" and (ii) the value of the pointer RSLP is greater than the value of the pointer WSLP. The slot number, stored at an address of the SCM designated by the pointer RSLP, is one for a slot currently being output, as described later. Accordingly, a slot having a smaller number than the foregoing number is required to have already been read and it is therefore possible to perform write operations.

The read slot setting procedure in relation to Procedure 2.5 is described in detail. When the work OTYW is "IP", what is required for the control unit 14 is to set the value of the register ORWR to the register RSLR. At the time of providing images of the coding type I or P, the read field's read slot number may be increased by one from zero. Also, the register's ORWR output row number is increased by one from zero. The value of the register ORWR is set to the register RSLR.

When the work OTYW is "B", the control unit 14 executes simple processing, i.e., Procedures 4.1 to 4.3, for setting the register RSLR. This is a result of the preparation process shown in Procedures 3.5 and 3.6. The pointer RSLP is incremented by one for every output of eight lines.

Procedure 4.1: A slot number Z is extracted from a word at an address of the SCM specified by the pointer RSLP.

Procedure 4.2: The slot number Z is written to the register RSLP.

Figure 16:
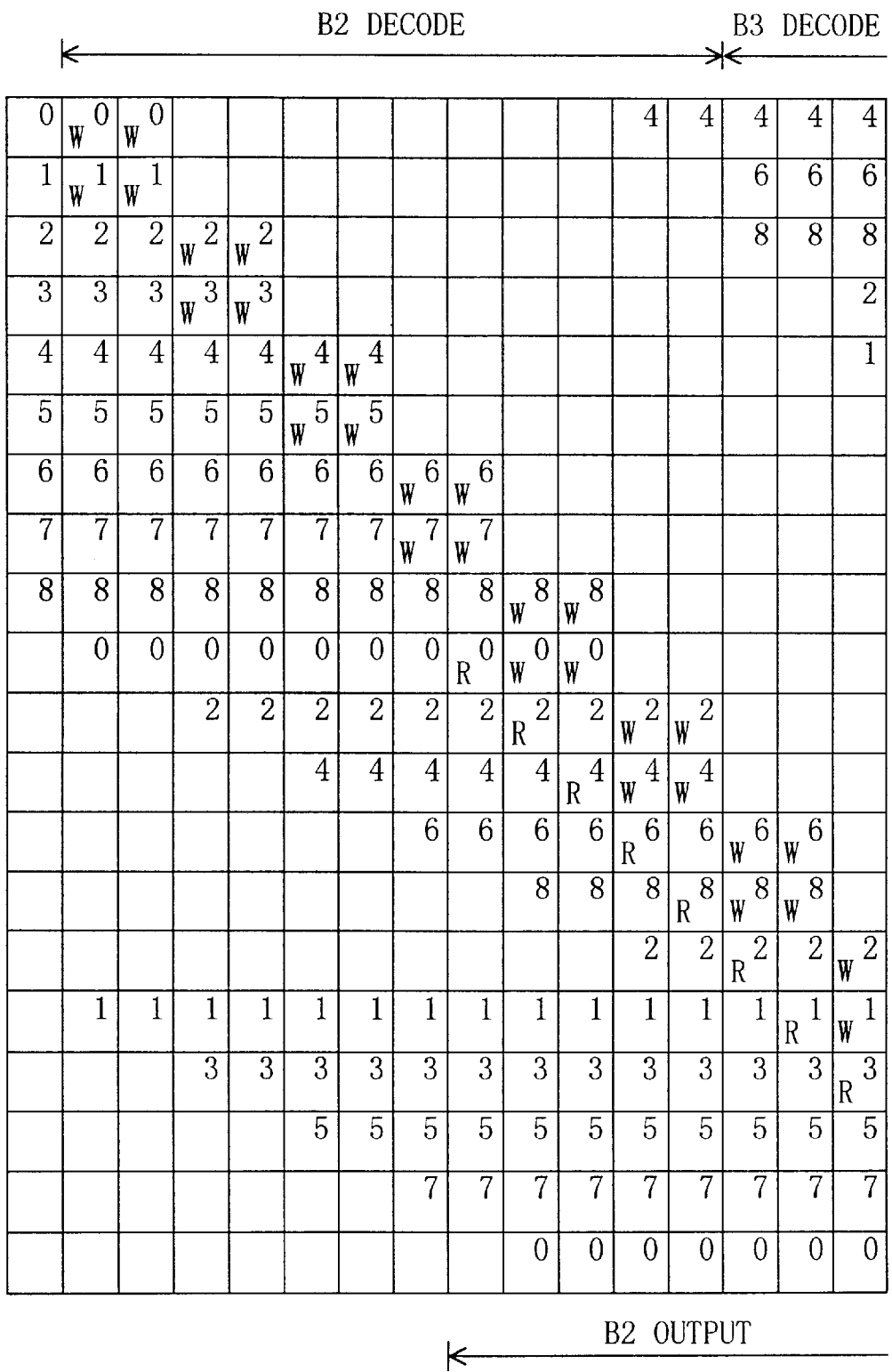
FIG. 16 is a diagram showing an example of the process of updating an SCM (slot control memory) shown in FIG. 8.

Procedure 4.3: The pointer RSLP is increased by one. Referring now to FIGS. 10–17, the operation of the MPEG decoder 10 of FIG. 1 is described in detail. FIGS. 10–15 show the process of updating each of the registers and FIGS. 16 and 17 show the process of updating the SCM. Like FIG. 9, the bit stream IN is fed to the BSAU 12 in the order I0, P1, P4, B2, B3, P5 (see FIGS. 10–17). The pictures P1, P4, B2, and P5 have a frame structure while on the other hand the pictures I0 and B3 have a field structure. For the sake of simplifying the description, N=6 and Sn=9. Here, decoding 16 lines takes time necessary for outputting 16 lines, and no decode operations are carried out in VB (the vertical blanking period).

Referring to FIGS. 10–15, periods, numbered from 0 up to 71, are in corresponding fashion to 8-line output periods. The pictures I0, P1, B2, B3, and P4 are output or displayed in that order. The decode starting point of each frame is the output starting point of the top field's last eight lines (OPYR=0). In the figures, "FR" stands for the frame structure and "FD" stands for the field structure. Here, paying attention to Period 24 of FIG. 12, the register B_WFDR and the register RFDR have the same value, i.e., 4. This means that Field #4 undergoes read and written operations at the same time. However, in Period 24, the value of the register RSLR has already reached five and both the value of the register WSR1 and the value of the register WSR2 are zero and therefore there are produced no problems at all. From Period 43 up to Period 59 the registers T_WFDR, B_WFDR, and RFDR each have a value of zero. That is, in relation to the images of the coding type B, Field #3 and the three additional slots are read and written at the same time. In any of Period 43 to Period 59, however, the registers WSR1, WSR2, and RSLR have different values and therefore there are produced no problems at all.

FIGS. 16 and 17 show a process of updating the SCM in relation to the write slot setting procedure (Procedures 3.1 to 3.7) when the work DTYW is "B" and the read slot setting procedure (Procedures 4.1 to 4.3) when the work OTYW is "B". In FIGS. 16 and 17, each row represents a word of the SCM and each column corresponds to an 8-line output period. As shown in the leftmost column of FIG. 16, initial values from zero to eight are stored in words at Address #0 to Address #8 of the SCM. The initial value of the pointer WSLP is zero and the initial value of the pointer RSLP is nine. The storage capacity of the SCM is 20 words.

Figure 13:
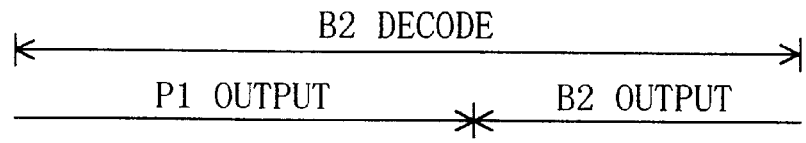
FIG. 13 is a continuation to FIG. 12.

The columns, located second and third from the left-hand side of FIG. 16, correspond to the decoding period of the first 16 lines of the picture B2 having the frame structure, i.e., Periods 36 and 37 of FIG. 13. In these periods, the slot number 0 is extracted from a word at Address #0 of the SCM specified by the pointer WSLP and the slot number 1 is extracted from a word at the next address, i.e., Address #1. The slot number 0 is written to the register WSR1 and the slot number 1 is written to the register WSR2. At this time, according to Procedures 3.5 and 3.6, in order to prepare the setting of the register RSLR, the slot numbers 0 and 1 are written to a word at Address #9 and to a word at Address #15, respectively. The pointer WSLP is increased by two.

The column, located ninth from the left-hand side of FIG. 16, corresponds to a period of providing the first eight lines of the top field of the picture B2, i.e., Period 43 of FIG. 13. In this period, the slot number 0 is extracted from a word at an address of the SCM specified by the pointer RSLP (Address #9) and is then written to the register RSLR. This slot number 0 is the number that had been written to the SCM a half-frame period earlier. The pointer RSLP is increased by one.

The columns, located fourteenth and fifteenth from the left-hand side of FIG. 16, correspond to the decoding period of the first 16 lines of the picture B3 having the field structure, i.e., Periods 48 and 49 of FIG. 14. In these periods, the slot number 6 is extracted from a word at an address of the SCM specified by the pointer WSLP (Address #12) and the slot number 8 is extracted from a word at the next address (Address #13). The slot number 6 is written to the register WSR1 and the slot number 8 is written to the register WSR2. At this time, according to Procedures 3.5 and 3.6, in order to prepare the setting of the register RSLR, the slot numbers 6 and 8 are written to words at Address #1 and Address #2 of the SCM, respectively. The pointer WSLP is increased by two.

The fifth leftmost column of FIG. 17 corresponds to a period of providing the first eight lines of the top field of the picture B3, i.e., Period 55 of FIG. 14. In this period, the slot number 6 is extracted from a word at an address of the SCM specified by the pointer RSLP (Address #1). The slot number 6 is then written to the register RSLR. This slot number 6 is the one that had been written to the SCM a half-frame period earlier. The pointer RSLP is increased by one.

FIGS. 16 and 17 show that in any of the periods the address of the "R" words (an "R" word is used for write slot setting) is greater than that of the "W" words (a pair of "W" words is used for read slot setting). This assures that a write-target slot is an already-read slot. Even when the period of decoding 16 lines becomes shorter than the period of outputting 16 lines because the decoding of the 16 lines is carried out at high speed, there will be produced no problems since it is arranged such that the control unit 14 waits for Condition 4 to be met.

As described above, the MPEG decoder 10 of FIG. 1 makes it possible to achieve the interlace conversion of B-pictures with one of the one-field memory blocks 20–24 and the three additionally slots under the condition that the decoding of the input bit stream IN is not carried out in VB, whereby the storage capacity of the frame memory 11 can be reduced down to about 2.5 frames.

Figure 18:
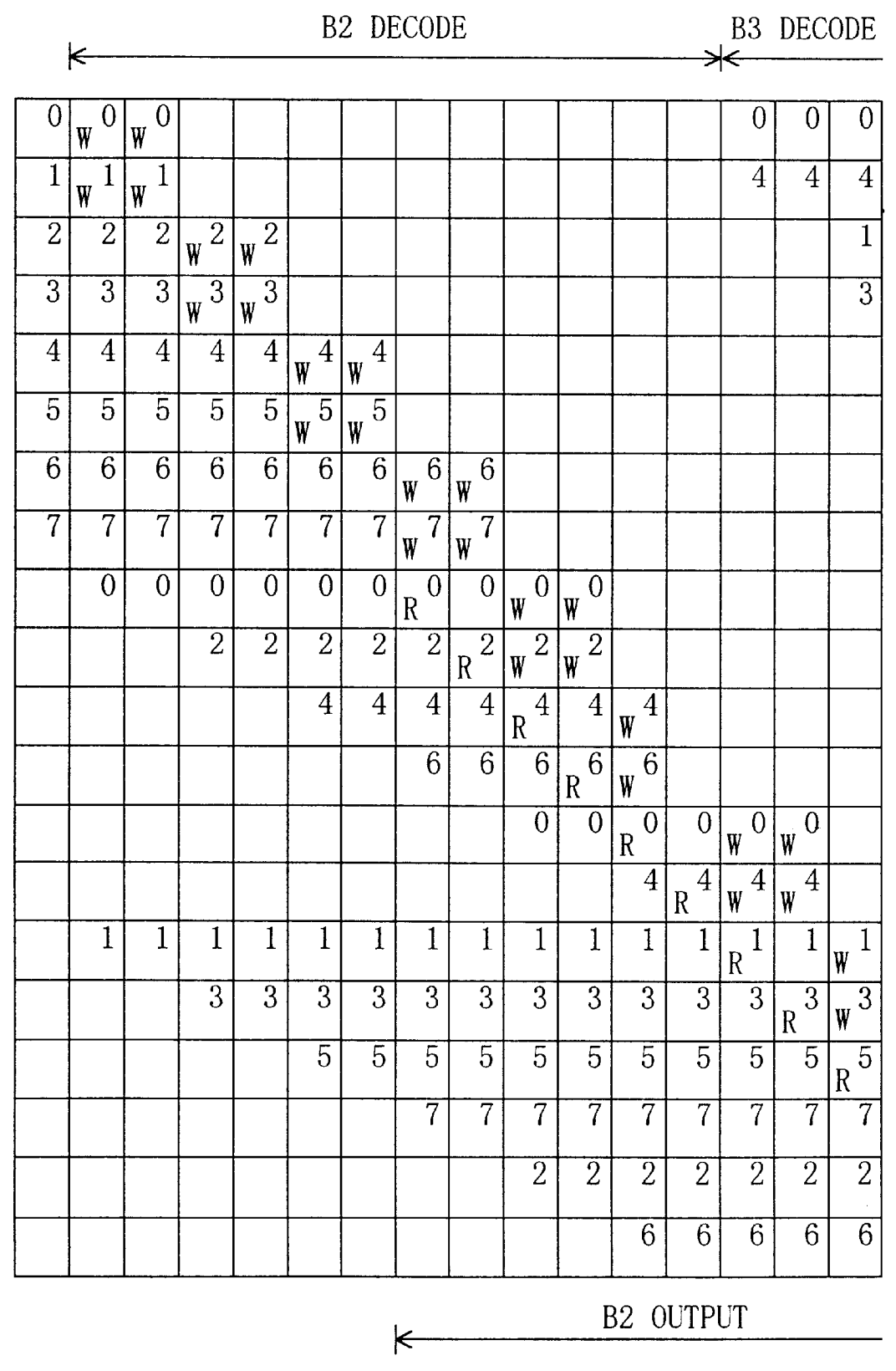
Figure 19:
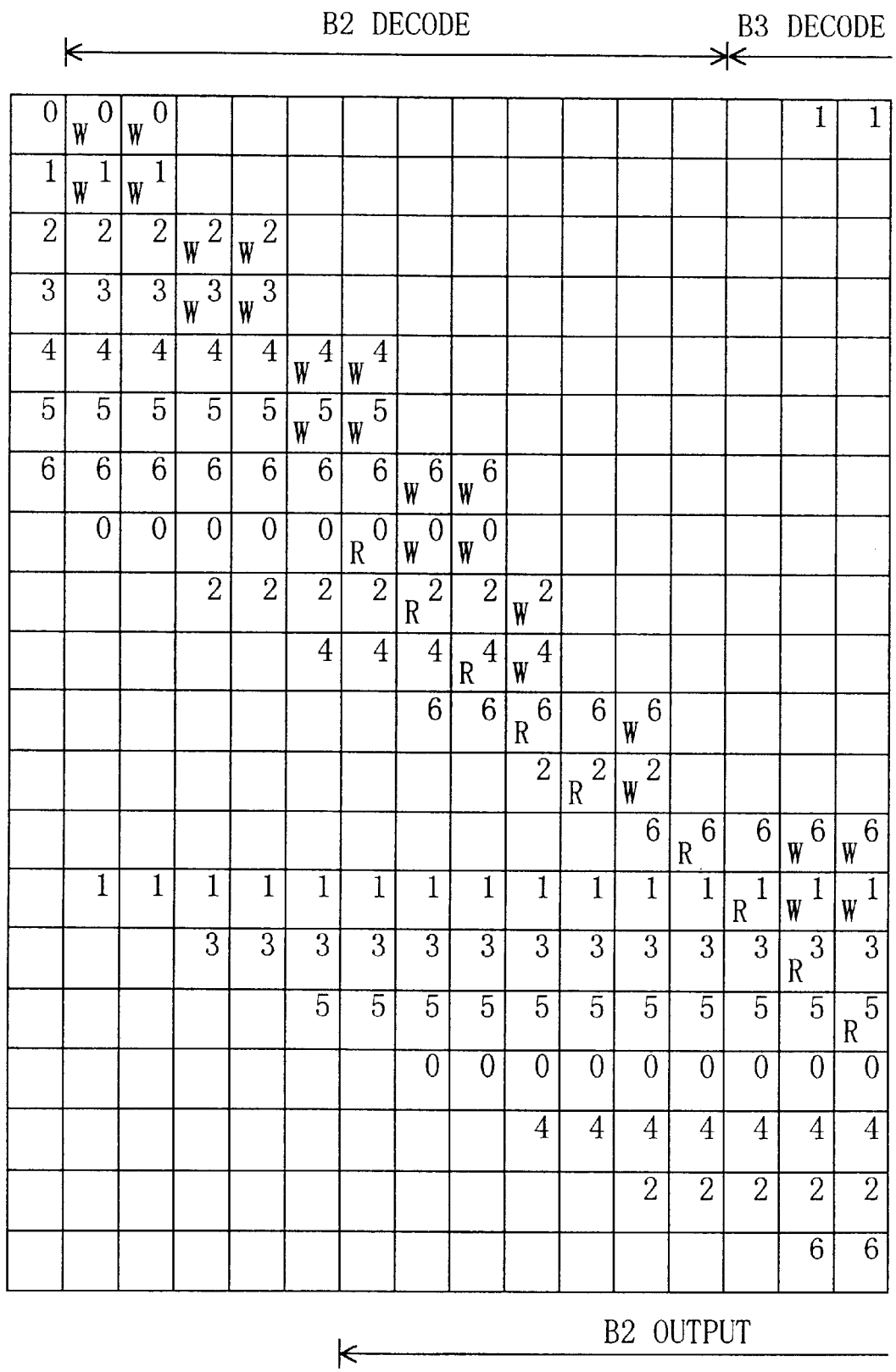
FIG. 19 is an equivalent diagram to FIG. 16 when the additional block of FIG. 2 is formed of a single additional slot.

The number of additional slots may be reduced. FIG. 18 shows an example of implementing B-picture interlace conversion using N+2 slots (N=6). However, a column, located fifth from the right-hand side of FIG. 18, requires a decode rate twice the other columns. FIG. 19 shows an example of implementing B-picture interlace conversion using N+1 slots (N=6). However, it is required by a column located fifth from the right-hand side that decoding for 16 lines be completed within a horizontal blanking period. Accordingly, B-picture interlace conversion may be implemented using N+3 slots. Even in such a case, it is possible to provide all memory functions necessary for MPEG2 with a single 16M-bit memory chip.

The invention claimed is:

1. An image processor with a frame memory, said frame memory including:

five blocks, each of said five blocks having a storage capacity to store a half image-frame; and a single additional block having a smaller storage capacity than each of said five blocks;

four blocks, selected from among said five blocks, serving to temporarily store I- and/or P-pictures for motion compensation reference;

the remaining one block and said additional block together forming a data memory for B-picture interlace conversion; and thereafter, said data memory for B-picture interlace conversion being reconstructed using one of said selected four blocks and said additional block.

2. The image processor of claim 1, said five blocks and said additional block being divided into respective pluralities of slots, each of said slots having a predetermined storage capacity;

said image processor further comprising:

a slot control memory for storing slot numbers; and a controller for controlling both read and write operations of said data memory by making use of said slot numbers stored in said slot control memory; and said controller writing a slot number, which was used in a write operation of entering information to said data memory, to said slot control memory for performing a read operation of acquiring information from said data memory.

3. The image processor of claim 2 further comprising:

a write slot pointer for designating a storage location of said slot control memory for a slot number which is used in a write operation of said data memory; and a read slot pointer for designating a storage location of said slot control memory for a slot number which is used in a read operation of said data memory;

wherein both said slot pointers are updated such that a certain slot of said data memory is written immediately said slot is read.

4. The image processor of claim 2 wherein each slot of said data memory has a storage capacity to store a data unit equivalent to half of the number of lines as a decoding process unit.

5. The image processor of claim 4 wherein said controller uses two slot numbers for controlling the operation of write of said data memory.

6. The image processor of claim 4 wherein, when said B picture has a frame structure, said controller uses two slot numbers for controlling the operation of write of said data memory in order that data units for a top and bottom fields together forming said B picture may be written to said data memory.

7. The image processor of claim 6 wherein said controller writes said two slot numbers to at storage locations of said slot control memory which are separated from each other by an amount of variation in a value of a read slot pointer made in a period from the time said top field's data are read to the time said bottom field's data are read.

8. The image processor of claim 4 wherein, when said B picture has a field structure, said controller uses two slot numbers for controlling the operation of write of said data memory in order that an upper half data unit and a lower half data unit together forming said B picture may be written to said data memory.

9. The image processor of claim 8 wherein said controller writes said two slot numbers to said slot control memory in order that a read slot pointer may acquire, in succession, data for said upper half field and data for said lower half field.

10. The image processor of claim 2 further comprising:

a write slot pointer for designating a storage location of said slot control memory for a slot number which is used in a write operation of said data memory; and a read slot pointer for designating a storage location of said slot control memory for a slot number which is used in a read operation of said data memory;

wherein said controller controls the value of said write slot pointer to fall below the value of said read slot pointer.

11. An image processor comprising:

a data memory having a plurality of slots;

a slot control memory for storing slot numbers; and a controller for controlling read and write operations of said data memory by making use of said slot numbers stored in said slot control memory;

wherein said controller controls the operations of read and write of said data memory in order that a slot of said data memory may be written immediately after said slot is read and another slot of said data memory is read in the first half portion of a period of time allocated to said writing to data memory.

12. The image processor of claim 11 further comprising a frame memory wherein (a) said frame memory includes five blocks, each of said five blocks having a storage capacity to store a half image-frame, and a single additional block having a smaller storage capacity than each of said five blocks, (b) four blocks, selected from among said five blocks, serve to temporarily store I- and/or P-pictures for motion compensation reference and the remaining one block and said additional block together form said data memory for B-picture interlace conversion, and (c) thereafter, said data memory for B-picture interlace conversion is reconstructed using one of said selected four blocks and said additional block.

* * * * *